United States Patent [19]

Senich

[11] Patent Number: 4,921,882
[45] Date of Patent: May 1, 1990

[54] ELECTRON BEAM IRRADIATED RELEASE FILM

[75] Inventor: George A. Senich, Malvern, Pa.

[73] Assignee: Hercules Incorporated, Wilmington, Del.

[21] Appl. No.: 207,407

[22] Filed: Jun. 16, 1988

Related U.S. Application Data

[63] Continuation-in-part of Ser. No. 106,686, Oct. 8, 1987, abandoned.

[51] Int. Cl.$^5$ .................. C08G 77/32; C08G 77/50; C08F 8/00; C08F 10/06
[52] U.S. Cl. .................................. 522/99; 525/903; 525/106; 522/184
[58] Field of Search ...................... 522/99; 525/903

[56] References Cited

U.S. PATENT DOCUMENTS

| | | | |
|---|---|---|---|
| 4,059,667 | 11/1977 | Pangonis | 264/289 |
| 4,172,101 | 10/1979 | Getson | 522/99 |
| 4,265,801 | 5/1981 | Moody et al. | 522/99 |
| 4,292,222 | 9/1981 | Grigo et al. | 525/106 |
| 4,411,945 | 10/1983 | Akao et al. | 428/216 |
| 4,500,688 | 2/1985 | Arkles | 525/106 |
| 4,530,879 | 7/1985 | Drahnak | 428/352 |
| 4,695,602 | 9/1987 | Crosby et al. | 525/903 |

Primary Examiner—John C. Bleutge
Assistant Examiner—Susan Berman
Attorney, Agent, or Firm—David Edwards

[57] ABSTRACT

An electron beam irradiated release film is formed from a melt processible composition including a silicone component crosslinked by the reaction of a hydride-containing silicone and a silicone containing an unsaturated substituent within a polymeric thermoplastic matrix to form a silicone pseudo-interpenetrating polymer network. The crosslinking of the silicone component by reaction of the hydride and unsaturated substituents is inititated during thermoplastic melt-mixing and film forming of the component with the matrix. Coated films are preferably formed by coextrusion of a polymeric thermoplastic film and a crosslinkable mixture of the silicone components and a polymeric thermoplastic. Alternatively, extrusion coating of the mixture onto a preformed film may be used to form the coated films. Preferably, these films have a thickness of from 0.000005 to 0.2 inch. The film is electron beam irradiated with a dose of from about 50 rad to about 50 Mrad.

12 Claims, 1 Drawing Sheet

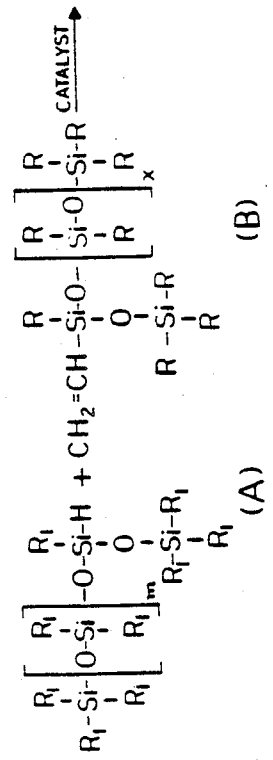
(A)
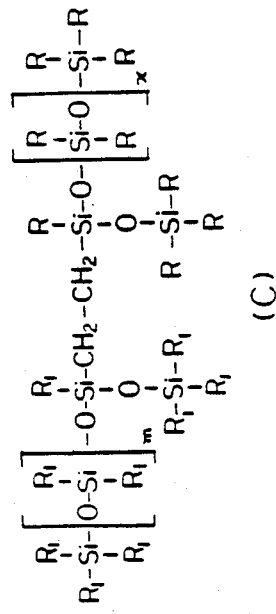
(B)
(C)

ELECTRON BEAM IRRADIATED RELEASE FILM

This is a continuation-in-part of U.S. patent application Ser. No. 106,686 filed Oct. 8, 1987 now abandoned.

The invention relates to electron beam irradiated coated release film. In particular, the invention provides a film or coating of a pseudointerpenetrating polymer network requiring low release force to pull it from an adhesive surface. These release films and coatings include a pseudointerpenetrating network of silicone and thermoplastic, such as polyolefin. The surfaces of these films and coatings have excellent release properties from pressure sensitive adhesives. The crosslinked nature of the silicone maintains the surface release properties of the film or coating over extended periods of time.

The silicone useful in accordance with the invention is a polymer based on a structure consisting of alternate silicon and oxygen atoms with various organic radicals attached to the silicon. Such silicone is sometimes referred to as organosiloxane. It is noted that oxosilane in which each silicon atom is single-bonded to four oxygen atoms is not particularly useful in accordance with the invention.

The prior art does not disclose a release film or a coated release film which includes a pseudointerpenetrating network of thermoplastic and silicone. Blizzard in U.S. Pat. No. 4,322,518 discloses curable silicone compositions of copolymeric siloxane and polydiorganosiloxane having controllable release forces for adhesives adhered thereto, (note column 6, lines 66–68 and column 7, lines 1–6). Blizzard in U.S. Pat. No. 4,423,095 discloses compositions including silicone resins and water-soluble or water-dispersed film-forming organic polymers useful in coating a substrate which can function, for example, as an adhesive-release coating. Arkles, in U.S. Pat. No. 4,500,688, discloses pellets of thermoplastic and silicone treated with a curing catalyst. These pellets, on subsequent remelting, form a pseudointerpenetrating network structure Fujii, et al., in U. S. Pat. No. 4,603,086, discloses radiation-cured films of silicon compounds of organopolysiloxane having at least one amino group per molecule and an acrylic compound having at least two acrylate groups per molecule. None of these references discloses the pseudointerpenetrating network of the invention.

Typically, release films are coated with release agents such as silicones or waxes. Silicone-coated papers are of major commercial importance and used as abherents in a wide variety of applications such as interleafing papers for uncured rubber and other adhesive materials, and in the coated fabrics industry for use in casting or transfer coating poly(vinyl chloride)plastisols, latexes, and polyurethanes which impart embossing finishes to a coated product.

A pseudointerpenetrating network of polymers is a crosslinked polymer having entangled therein a polymer which is not crosslinked. Interpenetrating networks differ from pseudointerpenetrating networks in that they consist of two crosslinked polymers the chains of which are interlocked. In the pseudointerpenetrating network formed into a film or coated onto a film, in accordance with the invention, the crosslinked polymer is silicone and the polymer entangled therein is a thermoplastic.

The polyolefin films of the invention require low force to be released from pressure sensitive adhesive formulations. In a preferred embodiment of the invention, the films are a pseudointerpenetrating network (IPN) of a silicone in a thermoplastic such as a polyolefin. The pseudointerpenetrating network may constitute the complete film or it may be a coating on either one or both surfaces of a polyolefin core film. Depending on the technique used to make the film of a pseudointerpenetrating network, the release surface of the film may be unoriented, uniaxially oriented or biaxially oriented. The core layer of the film can be clear or opaque (pigmented or voided).

BRIEF DESCRIPTION OF THE INVENTION

A release film is formed from a melt processible composition including a silicone component crosslinked by the reaction of a hydride-containing silicone and a vinyl containing silicone within a polymeric thermoplastic to form a silicone pseudointerpenetrating polymer network. The crosslinking of the silicone component by reaction of the hydride-containing silicone is initiated during thermoplastic melt-mixing and film forming. Preferably, film forming is followed by electron beam irradiation. Coated films are preferably formed by coextrusion of a polymeric thermoplastic film and a mixture of silicone and thermoplastic. Alternatively, extrusion coating of the mixture onto a pre-formed film may be used to form the coated film. Preferably, the pseudointerpenetrating polymer network film and coated film each have a thickness of from 0.000005 to 0.2 inch. The film is electron beam irradiated with a dose of from about 50 rad to about 50 Mrad.

BRIEF DESCRIPTION OF THE DRAWING

The drawing shows the crosslinking reaction of silicone components which occurs in the formation of release films having a pseudointerpenetrating polymer network in accordance with the invention.

DETAILED DESCRIPTION OF THE INVENTION

Films and coated films in accordance with the invention include a pseudointerpenetrating network which includes a silicone component and a thermoplastic component. The thermoplastic component of the pseudointerpenetrating network preferably includes a thermoplastic in an amount of from about 65 to 95 percent by weight of the pseudointerpenetrating network. Preferably, the thermoplastic is a polyolefin such as polypropylene, polyethylene or a copolymer. The silicone component preferably includes silicone in an amount of from about 10 to 25 percent by weight of the pseudointerpenetrating network. The silicone component includes silicone (A) having unsaturated substituents, mixed with silicone (B) which contains a proportion of hydrosilane ($=Si-H$) groups:

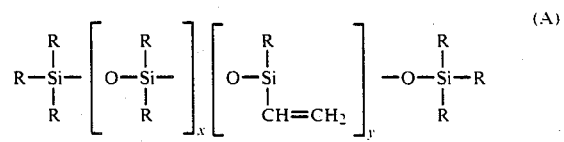

(A)

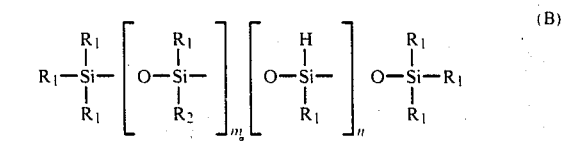

(B)

wherein each R is independently an alkyl, alkylene, cycloalkylene or aryl group of 1 to about 12 carbon atoms, $R_1$ is independently hydrogen, an alkyl or aryl of from 1 to 12 carbon atoms, and m, n, x and y are independently whole number integers from 1 to 1,000.

The plurality of alkylene, such as vinyl groups on silicone (A) and hydrosilane groups on silicone (B) react under the influence of catalyst to give a cross-linked structure (C) as shown in the drawing.

The catalyst is typically a platinum complex derived from chloroplatinic acid and a vinyl siloxane and the amount of platinum preferably present in the reaction mass is in range of the 1-15 ppm parts of silicone. This reaction is more fully described by Arkles in U.S. Pat. No. 4,100,688. The reactive mixture is blended with a thermoplastic and cures under the influence of heat and the catalyst to form a pseudointerpenetrating network with the polyolefin during the film making process.

Silicone surfaces have good release properties because of their low surface free energy. In the present invention it is thought that the silicones, which are incompatible with the polyolefin, tend to migrate towards the film surface. As this occurs, however, the silicones are reacting, providing the net result of a surface enriched in silicone which is at least partially immobilized due to crosslinking. Electron beam irradiation provides additional cross linking. Thus, the film surface has sufficient silicone character to confer good release characteristics from pressure sensitive adhesives and other substrates.

The films may consist entirely of the pseudointerpenetrating network of a silicone in a thermoplastic, such as a polyolefin. Alternatively, the pseudointerpenetrating network of a silicone in a thermoplastic such as a polyolefin can be present as a surface layer on one or both sides of a thermoplastic core film. Composite (or coated) films of this type can be made by coextrusion or extrusion coating. The core of such a composite film can be a polyolefin or other thermoplastic and can be clear or opaque. Composite films having relatively thin surface layers are a preferred embodiment.

In a preferred embodiment of the invention, an oriented polyolefin film with a typical thickness range of 0.0005-1.0 millimeter (0.00002 to 0.04 inch), made by either a tubular or tenter process, is employed as a core to the surface of which is applied a thin layer of the pseudointerpenetrating network of silicone and polyolefin. The polyolefic core, usually contains additives for the purpose of imparting color, slip, antiblock or material strength. Current extrusion technology limits the dispersability of silicones in the thermoplastic mixture being extended. Preferably, the concentration of silicones in the thermoplastic extruded mixture is lower than 25% by weight of the extruded mixture. More preferably, the concentration of silicones in the thermoplastic extruded mixture is from about 1% to about 25% by weight of the extruded mixture. Most preferably, the silicone component of the film or coating in accordance with the invention is from 10% to 25% by weight of the extruded mixture used to form the film or coating. The lower limit for the percentage (concentration) of the silicone in the extruded mixture is determined by the desired release properties, and can vary from about 1 to 5% depending upon the intended application.

Preferably, the films and coatings in accordance with the invention contain from 0.01 to 0.3 percent by weight platinum complex based on the amount of polysiloxane. Preferably, the silicone containing unsaturated substituents used to make films and coatings in accordance with the invention is from 0.001 to 0.5 weight percent vinyl substituted. Preferably, the silicone used to make films and coatings in accordance with the invention is from 0.002 to 1 weight percent hydride substituted.

Preferably, the films and coated films, in accordance with the invention, are at least uniaxially oriented. More preferably, the films and coated films of the invention are biaxially oriented. Preferably, coated films in accordance with the invention are formed by coextrusion or extrusion coating. Preferably, the films of the invention are formed by a tubular process or a tenter process.

Preferably, the extruded mixture consists of a silicone component and an orientable thermoplastic. The thermoplastic preferably is a polyolefin, (for example polypropylene or Polyethylene), polyolefin copolymer (such as a copolymer of ethylene and propylene), polyester, polyamide (such as nylon), polystyrene, or an orientable blend of thermoplastic polymers, (such as polyvinylchloride and polycaprolactone). More preferably, the extruded mixture consists of a silicone component and a polyolefin or copolyolefin.

In Examples 1-12 the following procedure is used for testing release characteristics.

PROCEDURE

The first three layers of a one (1) inch wide roll of #800 or #610 Scotch (TRADEMARK of 3M Company) prescription label tape are removed and discarded. Then a ten-inch strip of tape is peeled off the roll. The tape is folded so that the adhesive side of four inches of the strip is in contact with the adhesive side of the adjacent four inches of the strip. This leaves two inches of uncovered adhesive surface. The portion, on which the adhesive is covered, is referred to as a "tab". The two-inch portion of the strip of tape on which the adhesive is exposed is placed on the $8 \times 8 \times 0.001$ inch release film. Another ten-inch strip of tape is peeled off and folded, as described above, to form a four-inch tab and a two-inch uncovered portion of adhesive. This strip of tape is placed on a $2 \times 5 \times 1/16$ inch stainless steel test panel parallel to the five-inch dimension of the plate (as a control).

The stainless steel test panel has been cleaned just prior to the start of the procedure with toluene, and a lint free tissue. Panels are rubbed with toluene in a lengthwise direction and then allowed to air dry.

These steps are continued, alternately placing a strip of tape from the roll onto a release film and then placing the next strip of tape onto a steel plate until there are five strips of tape on the release film and five strips of tape on stainless steel plates.

A 4.5 pound roller is used to roll over each piece of tape twice (up and back). No pressure is applied to the roller other than pushing it forward and pulling it backward. After 4 hours, the tape is pulled from the stainless steel panels by the Instron Tensile Tester at 20 inches per minute crosshead speed and the force required to remove them is recorded as the release force. Then the stainless steel panels are again cleaned with toluene and lint-free tissue. The tape is then pulled from the film. The force required to pull the tape from the film is measured. This force is referred to as the release force, and is a measurement of the magnitude of the resistance to adhesion of the film from a given adhesive which enables the film to be removed from that adhesive.

Immediately after the pull is made, each strip of tape is applied to the clean stainless steel panel, as described above, and the force required to remove each strip from the panel is measured, using the Instron Tensile Tester at 12 inches per minute cross head speed. The force is referred to as subsequent adhesion, and is a measurement of the magnitude of the adhesion provided by the adhesive for stainless steel.

Release force is represented by the amount of pulling force required to separate a standard adhesive tape from a given sample of adhesive, and is expressed in g/inch of width of the tape. Subsequent adhesion is represented by the force required to pull the standard adhesive tape from a stainless steel panel after the tape has been in contact with and pulled from a release film sample. The value for subsequent adhesion is also expressed in g/inch.

Release force can be measured on the Instron (trademark) peel tester, for example, at 20 inches per minute cross head speed. The test films are pulled at an approximate 180° pull angle between the tape and the release surface. A low value of release force coupled with a high subsequent adhesion, is the desirable combination of properties for a release film. High values of release force indicate that the film overly adheres to the adhesive.

In Examples 1-12, below, polydimethylsiloxane (lower crosslink density) refers to hydrosiloxane polymer which is about 0.03 weight percent vinyl substituted and contains about 0.1 weight percent silane groups. Polydimethylsiloxane (low crosslink density) refers to siloxane polymer which is about 0.04 weight percent vinyl substituted and contains about 0.15 weight percent silane groups.

EXAMPLE 1

A release film was prepared by applying an extrusion release coating of 20% polydimethylsiloxane (low crosslink density; Petrarch Systems, Inc. PSW-2258), containing 0.01% platinum-cyclovinylmethylsiloxane complex, in isotactic polypropylene stabilized with antacid and antioxidant to a uniaxially oriented sheet of isotactic polypropylene stabilized with antacid and antioxidant and containing a processing aid. The uniaxially oriented sheet was first extruded at about 240° C. and cast into a 0.077 inch thick casting then uniaxially oriented by stretching to 5.5 times the original length at about 130° C. To this uniaxially oriented sheet was applied a one side extrusion coating of the previously described polysiloxane release material which was extruded at about 287° C. The extrusion coated uniaxially drawn sheet was oriented by stretching to 9 times the original width at about 160° C. followed by a 10% shrink. The resulting film is 2.2 mils in total thickness, the release layer comprising 0.2 mils of the thickness.

The resultant film is tested for release characteristics by applying #800 and #610 Scotch tape (3M Company) pressure sensitive adhesive tapes under a 4.5 pound roller to the coated side and then subsequently pulling the tapes off the film surface at a rate of 20 inches/min in an Instron tester. A release force of 126 g/in is measured for #800 Scotch tape and 357 g/in for #610 Scotch tape.

A 5.5 by 5.5 inch sample of the above film is exposed to electron beam irradiation in an Electrocurtain apparatus (Energy Sciences, Inc.) by passing the film at various speeds under an electron beam of 170 to 175 kV at various beam currents at room temperature and in an atmosphere of 21% oxygen by volume. The coated side of the irradiated film is tested for release characteristics in the manner described above. With a sample speed of 150 ft/min and beam current of 0.1 ma (dose 0.05 Mrad), a release force of 45 g/in is measured for #800 Scotch tape and 210 g/in for #610 Scotch tape. With a sample speed of 137 ft/min and a beam current of 0.2 ma (dose 0.1 Mrad), a release force of 45 g/in is measured for #800 Scotch tape and 267 g/in for #610 Scotch tape. With a speed of 153 ft/min and a beam current of 0.8 ma (dose 0.3 Mrad), a release force of 29 g/in is measured for #800 Scotch tape and 258 g/in for #610 Scotch tape. With a sample speed of 87 ft/min and a beam current of 0.8 ma (dose 0.5 Mrad), a release force of 31 g/in is measured for #800 Scotch tape and 181 g/in for #610 Scotch tape. With a sample speed at 35 ft/min and a beam current of 1.0 ma (dose 2.0 Mrad), a release force of 30 g/in is measured for #800 Scotch tape.

EXAMPLE 2

A 5.5 by 5.5 inch sample of the film described in Example 1 is exposed to electron beam irradiation as described in Example 1 except that the atmosphere during irradiation contains 80 ppm oxygen. The coated side of the irradiated film is tested for release characteristics in the manner described in Example 1. With a sample speed of 95 ft/min and a beam current of 1.0 ma (dose 0.5 Mrad), a release force of 18 g/in is measured for #800 Scotch tape. With a sample speed of 35 ft/min and beam current of 1.0 ma (dose 2.0 Mrad), a release force of 34 g/in is measured for #800 Scotch tape.

EXAMPLE 3

A 5.5 inch wide roll of the film described in Example 1 is exposed to 175 kV electron beam irradiation by unwinding the roll at an unwind stand, passing the roll through an Electrocurtain apparatus at 180 ft/min, at room temperature and in an atmosphere of 21% oxygen by volume, then rewinding the irradiated film. The coated side of the irradiated film is tested for release characteristics in the manner described in Example 1. With a beam current of 1.0 ma (dose 0.34 Mrad), a release force of 26 g/in is measured for #800 Scotch tape and 350 g/in for #610 Scotch tape.

EXAMPLE 4

A 5.5 inch wide roll of the film described in Example 1 is exposed to electron beam irradiation as described in Example 3 except that the atmosphere during irradiation contains 90 ppm oxygen. The coated side of the irradiated film is tested for release characteristics in the manner described in Example 1. With a beam current of 1.0 ma (dose 0.34 Mrad), a release force of 22 g/in is measured for #800 Scotch tape and 175 g/in for #610 Scotch tape.

EXAMPLE 5

1000 g of 20% polydimethylsiloxane (low crosslink density, Petrarch Systems, Inc. PSW-2258), containing 0.01% platinum-cyclovinylmethylsiloxane complex, in isotactic polypropylene stabilized with antacid and antioxidant is extruded at a temperature of about 260° C. (500° F.) and cast into a 0.028 inch sheet. Plaques 2.25 by 2.25 inch are cut from this sheet and biaxially oriented by stretching to five times the original length and width at 145° C. followed by a 10% shrink. The resultant film is tested for release characteristics in the manner described in Example 1. A release force of 154 g/in is measured for #800 Scotch tape and 215 g/in for #610 Scotch tape.

Plaques are irradiated by the electron beam of a Van De Graaff generator (High Voltage Engineering) by passing the plaques under an electron beam of 2 MV at a dose of 0.5 Mrad or 2.0 Mrad at room temperature and in an atmosphere of 21% oxygen by volume. Following irradiation, the plaques are biaxially oriented as described above.

The resultant film is tested for release characteristics in the manner described in Example 1. For films made from plaques irradiated at 0.5 Mrad, a release force of 127 g/in is measured for #800 Scotch tape and 165 g/in for #610 Scotch tape. For films made from plaques irradiated at 2.0 Mrad, a release force of 95 g/in is measured for #800 Scotch tape and 116 g/in for #610 Scotch tape.

EXAMPLE 6

A release film was prepared by applying an extrusion coating of 20% polydimethylsiloxane (low crosslink density; Petrarch Systems, Inc. PSW-2341), containing 0.01% platinum-divinyl-tetramethyldisiloxane complex, in isotactic polypropylene stabilized with antacid and antioxidant to a uniaxially oriented sheet of 88% by weight isotactic polypropylene and 12% by weight ethylene-propylene copolymer stabilized with antacid and antioxidant The uniaxially oriented sheet was first extruded at about 258° C. and cast into a 0.082 inch thick sheet then uniaxially oriented by stretching to 5.6 times the original length at about 129° C. To this uniaxially oriented sheet was applied a one side extrusion coating of the previously described polysiloxane release material which was extruded at about 285° C. The extrusion coated uniaxially drawn sheet was oriented by stretching to 9.5 times the original width at about 157° C. followed by a 4% shrink. The resulting film is 2.23 mils in total thickness, the release layer comprising 0.23 mils of the thickness. The coated side of the resultant film is tested for release characteristics in the manner described in Example 1. A release force 232 g/in is measured for #800 Scotch tape and 864 g/in for #610 Scotch tape.

A 5.5 by 5.5 inch sample of the film is exposed to electron beam irradiation as described in Example 1. The coated side of the irradiated film is tested for release characteristics in the manner described in Example 1. With a dose of 0.45 Mrad, a release force of 63 g/in is measured for #800 Scotch tape and 442 g/in for #610 Scotch tape.

EXAMPLE 7

A 5.5 by 5.5 inch sample of the film described in Example 6 is exposed to electron beam irradiation as described in Example 1 except that the atmosphere during irradiation contains 150 ppm oxygen. The coated side of the irradiated film is tested for release characteristics in the manner described in Example 1. With a dose of 1.5 Mrad, a release force of 17 g/in is measured for #800 Scotch tape and 249 g/in for #610 Scotch tape.

EXAMPLE 8

A release film was prepared by coextruding a release layer of 20% polydimethylsiloxane (low crosslink density; Petrarch Systems, Inc. PSW-2339), containing 0.01% platinum-cyclovinylmethylsiloxane complex, in isotactic melt viscosity modified polypropylene stabilized with antacid and antioxidant with a layer of 88% by weight isotactic polypropylene and 12% by weight ethylene-propylene copolymer stabilized with antacid and antioxidant.

The extrusion temperature for the polysiloxane-containing layer is about 200° C.; the extrusion temperature for the polyolefin layer is about 257° C. The coextrusion was cast into a 0.082 inch thick sheet then uniaxially oriented by stretching to 5.1 times the original length at about 130° C. This uniaxially oriented sheet was drawn by stretching to nine times the original width at about 170° C. followed by a 6% shrink with heat. The resulting film is 1.45 mil in total thickness, the release layer comprising 0.05 mil of the thickness. The polysiloxane-containing side of the resultant film is tested for release characteristics in the manner described in Example 1. A release force of 137 g/in is measured for #800 Scotch tape and 320 g/in for #610 Scotch tape.

A 5.5 by 5.5 inch sample of the film is exposed to electron beam irradiation as described in Example 1. The polysiloxane-containing side of the irradiated film is tested for release characteristics in the manner described in Example 1. With a dose of 0.4 Mrad, a release force of 28 g/in is measured for #800 Scotch tape and 110 g/in for #610 Scotch tape. With dose of 0.8 Mrad, a release force of 24 g/in is measured for #800 Scotch tape and 72 g/in for #610 Scotch tape. With a dose of 1.2 Mrad, a release force of 17 g/in is measured for #800 Scotch tape and 56 g/in for #610 Scotch tape. With a dose of 2.4 Mrad, a release force of 58 g/in is measured for #800 Scotch tape and 418 g/in with #610 Scotch tape. With a dose of 3.6 Mrad, a release force of 46 g/in is measured for #800 Scotch tape and 413 g/in for #610 Scotch tape.

EXAMPLE 9

A 5.5 by 5.5 inch sample of the film described in Example 8 is exposed to electron beam irradiation as described in Example 1 except that the atmosphere during irradiation contain 160 ppm oxygen. The polysiloxane-containing side of the irradiated film is tested for release characteristics in the manner described in Example 1. With a dose of 0.2 Mrad, a release force of 45 g/in is measured for #800 Scotch tape and 178 g/in for #610 Scotch tape. With a dose of 0.4 Mrad, a release force of 14 g/in is measured for #800 Scotch tape and 60 g/in for #610 Scotch tape. With a dose of 0.8 Mrad, a release force of 39 g/in is measured for #800 Scotch tape and 147 g/in for #610 Scotch tape. With a dose of 1.2 Mrad, a release force of 47 g/in is measured for #800 Scotch tape and 130 g/in for #610 Scotch tape. With a dose of 1.5 Mrad, a release force of 64 g/in is measured for #800 Scotch tape and 211 g/in for #610 Scotch tape.

EXAMPLE 10

A 50 inch wide roll of the release film described in Example 8 is exposed to electron beam irradiation as described in Example 3 except that the atmosphere for irradiation is less than 500 ppm oxygen. The polysiloxane-containing side of the irradiated film is tested for release characteristics in the manner described in Example 1. With a beam current of 45 ma (dose 1.0 Mrad), a release force of 6 g/in is measured for #800 Scotch tape and 15 g/in for #610 Scotch tape.

EXAMPLE 11

A 5.5 by 5.5 inch sample of the release film described in Example 8 is exposed to electron beam irradiation as described in Example 1 except that the atmosphere contains 160 ppm oxygen and the film temperature is about 80° C. while being irradiated. The polysiloxane-containing side of the irradiated film is tested for release characteristics in the manner described in Example 1. With a dose of 1.5 Mrad, a release force of 115 g/in is measured for #800 Scotch tape and 256 g/in for #610 Scotch tape.

EXAMPLE 12

A 5.5 by 5.5 inch sample of the release film described in Example 8 is exposed to electron beam irradiation as described in Example 11 except that the film temperature is about −40° C. while being irradiated. The polysiloxane-containing side of the irradiated film is tested for release characteristics in the manner described in Example 1. With a dose of 1.5 Mrad. a release force of 65 g/in is measured for #800 and 332 g/in for #610 Scotch tape.

Example 1 shows that electron beam irradiation at doses from 0.05 to 2 Mrad applied to a uniaxially oriented layer of release composition on a layer of isotactic polypropylene is effective in lowering the adhesive release force for the adhesives used compared to the unirradiated film. A comparison of Examples 1 and 2 shows that for the adhesives used irradiation in an atmosphere of 80 ppm oxygen further lowers adhesive release force after 0.5 Mrad exposure and is not as effective in lowering release force after 2 Mrad exposure.

Examples 3 and 4 show that electron beam irradiation in a continuous manner is effective in lowering adhesive release force. Comparison of Examples 3 and 4 shows that continuous electron beam irradiation in an atmosphere of 90 ppm oxygen lowers adhesive release force with the adhesives used more than continuous electron beam irradiation in an atmosphere of 21% oxygen by volume.

Example 5 shows that electron beam irradiation before biaxial orientation lowers adhesive release force for the adhesives used. Comparison of Examples 5 and 1 shows that for the adhesives used the adhesive release force is lower when the sheet product is uniaxially oriented before irradiation than when it is biaxially oriented after irradiation.

Examples 6 and 7 show that electron beam irradiation of a uniaxially oriented layer of release composition on a layer of 88% isotactic polypropylene and 12% ethylene-propylene copolymer is effective in lowering the adhesive release force for the adhesives used. Comparison of Examples 6 and 1 shows that adhesive release force for the adhesives used is lower after electron beam irradiation of the release composition of Example 1 than after electron beam irradiation of the release composition of Example 6 when irradiation is performed in an atmosphere of 21% oxygen by volume Comparison of Examples 7 and 2 shows that adhesive release force for the adhesives used is lower after electron beam irradiation of the release composition of Example 7 than after electron beam irradiation of the release composition of Example 2 when irradiation is performed in atmospheres containing between 80 and 150 ppm oxygen.

Example 8 shows that electron beam irradiation at doses from 0.4 to 3.6 Mrad applied to a biaxially oriented layer of release composition on a layer of 88% isotactic polypropylene and 12% ethylene-propylene copolymer is effective in lowering the adhesive release force for the adhesives used compared to the unirradiated film. A comparison of Examples 8 and 1 shows that for the adhesives used adhesive release force is lower for biaxially oriented films irradiated at electron beam doses of 2 Mrad or lower than for uniaxially oriented films similarly irradiated. A comparison of Examples 8 and 9 shows that for the adhesives used irradiation in an atmosphere of less than 500 ppm oxygen lowers the electron beam irradiation dose required to achieve a low adhesive release force.

Example 10 shows that electron beam irradiation in a continuous manner is effective in lowering adhesive release force. Comparison of Examples 10 and 4 shows that continuous electron beam irradiation of a biaxially oriented layer of release composition on a layer of 88% isotactic polypropylene and 12% ethylene-propylene copolymer is more effective in lowering the adhesive release force for the adhesives used compared to continuous electron beam irradiation of a uniaxially oriented layer of release composition on a layer of isotactic polypropylene.

Example 11 shows that electron beam irradiation applied to a biaxially oriented layer of release composition on a layer of 88% isotactic polypropylene and 12% ethylene-propylene copolymer at a temperature of about 80° C. is effective in lowering the adhesive release force for the adhesives used compared to the unirradiated film. A comparison of Examples 11 and 9 shows that electron beam irradiation of a film at room temperature lowers adhesive release force with the adhesives used more than electron beam irradiation of a film at a temperature of about 80° C.

Example 12 shows that electron beam irradiation applied to a biaxially oriented layer of release composition on a layer of 88% isotactic polypropylene and 12% ethylene-propylene copolymer at a temperature of about −40° C. is effective in lowering the adhesive release force for the adhesives used compared to the unirradiated film. A comparison of Examples 12 and 9 shows that electron beam irradiation of a film at room temperature lowers adhesive release force with the adhesives used more than electron beam irradiation of a film at a temperature of about −40° C.

Preferably, the films and coatings in accordance with the invention contain from 0.01 to 0.3 percent by weight platinum complex based on the amount of polysiloxane.

Preferably, the silicone component of the film or coating in accordance with the invention is from 10 to 25 percent by weight of film or coating.

Preferably, the silicone containing unsaturated substituents used to make films and coatings in accordance with the invention are from 0.001 to 0.5 weight percent vinyl substituted.

Preferably, the silicone used to make films and coatings in accordance with the invention is from 0.002 to 1 weight percent hydride substituted.

The source of irradiation can be electron beams, such as from Van De Graaff generators or emitted from heated filaments, or gamma rays, such as from radioactive cobalt 60. More preferably, the source of irradiation is an electron beam, such as emitted from heated filaments or from Van De Graaff generators.

The accelerating voltage of the electrons is preferably within the range from about 10 kV to about 12 MV. More preferably, the accelerating voltage of the electrons ranges from about 100 kV to about 5 MV.

The electron dose is preferably from about 50 rad to about 50 Mrad. More preferably, the electron dose is from about 0.05 Mrad to about 5 Mrad.

The dose rate for electron beam irradiation is preferably from about 20 rad/s to about 200,000 Mrad/s. More preferably, the dose rate for electron beam irradiation is from about 1 Mrad/s to about 10,000 Mrad/s.

The oxygen content of the atmosphere surrounding the film during irradiation is preferably from no oxygen to pure oxygen. More preferably, the oxygen content of the atmosphere surrounding the film during irradiation ranges from about 1 ppm oxygen to about 21% oxygen by volume.

The temperature of the polymer release composition being irradiated is preferably from about $-210°$ C. to the highest melting temperature, if unoriented, or to the maximum orientation temperature, if oriented. More preferably, the temperature of the polymer release composition being irradiated is from about $-80°$ C. to the highest melting temperature, if unoriented, or to the maximum orientation temperature, if oriented.

Irradiation can occur before uniaxial or biaxial orientation. Uniaxial or biaxial orientation can follow irradiation. Uniaxial orientation is preferably from about 2 to about 50 times the original unoriented dimension. Biaxial orientation is preferably, independently, from about 2 to about 50 times the original unoriented dimension. Irradiation of unoriented material is also useful. More preferably, irradiation occurs after uniaxial or biaxial orientation, most preferably after biaxial orientation. More preferably, uniaxial orientation is from about 4 to about 20 times the original unoriented dimension. More preferably, biaxial orientation is, independently, from about 4 to about 20 times the original unoriented dimension.

Other features, advantages and specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What is claimed is:

1. An electron beam irradiated release film having a peak release force of from about 6 grams/inch of width to about 115 grams/inch of width using pressure sensitive adhesive tape, comprising:

a film formed from a melt processable composition, said composition comprising (i) a silicone component having an alkylene containing silicone portion and a hydride containing portion and (ii) a polymeric thermoplastic component, said silicone component being crosslinked in the presence of said polymeric thermoplastic component by the reaction of the hydride-containing silicone portion and the alkylene containing silicone portion under the influence of heat in the presence of a siloxane platinum complex catalyst to form a silicone pseudointerpenetrating polymer network, said crosslinking of said silicone component being initiated during thermoplastic melt-mixing and film forming of said components, and irradiating said network with an electron beam with a dose of from about 50 rad to about 50 Mrad to form the release film, said film having a thickness of from 0.000005 to 0.2 inch.

2. The film of claim 1 wherein said film is formed by a tubular process or a tenter process.

3. The film of claim 1 wherein said silicone containing alkylene groups include a plurality of vinyl groups.

4. The film of claim 1 wherein said polymeric thermoplastic component comprises from 65 to 95 percent by weight of said composition.

5. The film of claim 1 wherein said silicone component comprises from 1 to 25 percent by weight of said composition.

6. The film of claim 1 wherein said film is uniaxially oriented.

7. The film of claim 1 wherein said film is biaxially oriented.

8. The film of claim 1 wherein said silicone component comprises from 10 to 25 percent by weight of said film.

9. The film of claim 1 wherein said platinum complex comprises from 0.01 to 0.3 percent by weight of said silicone component.

10. The film of claim 1 wherein said silicone containing alkylene groups is from about 0.001 to about 0.5 weight percent vinyl substituted.

11. The film of claim 1 wherein the hydrides of said hydride-containing silicone comprise from about 0.005 to about 1.0 weight percent of said silicone.

12. The film of claim 1 wherein said polymeric thermoplastic comprises polypropylene or ethylene-hexane copolymer.

* * * * *

UNITED STATES PATENT AND TRADEMARK OFFICE
CERTIFICATE OF CORRECTION

PATENT NO. : 4,921,882

DATED : MAY 1, 1990

INVENTOR(S) : SENICH

It is certified that error appears in the above-identified patent and that said Letters Patent is hereby corrected as shown below:

Column 1, Line 40, " structure "

should read -- structure. --

Column 2, Line 68, (B) Second Group, " $R_2$ "

should read -- $R_1$ --

Column 3, Lines 14 and 15, " U.S. Pat. No. 4,100,688 "

should read -- U. S. Patent 4,500,688 --

Column 9, Line 54, " volume "

should read -- volume. --

UNITED STATES PATENT AND TRADEMARK OFFICE
CERTIFICATE OF CORRECTION

PATENT NO. : 4,921,882

DATED : MAY 1, 1990

INVENTOR(S) : SENICH

It is certified that error appears in the above-identified patent and that said Letters Patent is hereby corrected as shown below:

Column 12, Claim 12, line 44, " ethylene-hexane " should read -- ethylene-hexene --

Signed and Sealed this

Twentieth Day of August, 1991

*Attest:*

HARRY F. MANBECK, JR.

*Attesting Officer*   *Commissioner of Patents and Trademarks*